United States Patent
Stephenson et al.

[11] Patent Number: 5,915,712
[45] Date of Patent: *Jun. 29, 1999

[54] REMOVABLE HANDLES FOR MOUNTING ON THE HANDLES OF A WHEELCHAIR

[76] Inventors: John Thomas Stephenson, 902 Appling Ave., Placentia; Philip Simon, 20858 Kelvin Pl., Woodland Hills, both of Calif. 92670

[*] Notice: This patent is subject to a terminal disclaimer.

[21] Appl. No.: 08/447,706

[22] Filed: May 23, 1995

[51] Int. Cl.⁶ .................................................. B62J 29/00
[52] U.S. Cl. ..................... 280/304.1; 16/114 R; 403/305
[58] Field of Search .................................. 403/104, 109, 403/305, 362; 280/304.1, 47.371, 655.1; 16/111 R, 114 R

[56] References Cited

U.S. PATENT DOCUMENTS

| | | | |
|---|---|---|---|
| 2,245,993 | 6/1941 | McCoy | 403/109 X |
| 3,426,367 | 2/1969 | Bradford | 403/108 X |
| 4,247,216 | 1/1981 | Pansini | 403/109 |
| 4,679,261 | 7/1987 | Stanley et al. | 403/109 X |
| 5,044,650 | 9/1991 | Eberle, Jr. | 280/304.1 |
| 5,290,055 | 3/1994 | Treat, Jr. | 280/47.371 X |
| 5,421,548 | 6/1995 | Bennett et al. | 280/304.1 X |

*Primary Examiner*—Lanna Mai
*Assistant Examiner*—Michael Mar
*Attorney, Agent, or Firm*—W. Edward Johansen

[57] ABSTRACT

A removable handle for use with a wheelchair having two handles includes a handgrip crossbar which has two ends, two support posts, each of which is hollow and has a wall, and two connectors. The handgrip crossbar is coupled to one of the two ends of the handgrip crossbar in spaced parallel relation. Each connector connects one of the handles to the other end of one of the support posts. Each connector is cylindrical and has a first end, a second end and a wall. The connector is fixedly coupled to one of the two handles. The connector is slidably and detachably coupled to one of the support posts. Each support post has a hole in the wall. The connector has an inner surface with a groove adjacent to its first end. The connector also has a flat spring and a disc. The flat spring is disposed in one of the support posts. Each disc is fixedly coupled to one of the flat springs and is inserted in its hole. When each support post is inserted into one of the connectors, the groove securely engages the disc.

2 Claims, 2 Drawing Sheets

REMOVABLE HANDLES FOR MOUNTING ON THE HANDLES OF A WHEELCHAIR

BACKGROUND OF THE INVENTION

The field of the invention is removable handles for mounting on the handles of a wheelchair.

Wheelchairs are made in a wide variety of sizes and styles. Most wheelchairs include two laterally spaced parallel handles extending rearwardly from the upper end of the back of the wheelchair. U.S. Pat. No. 3,881,773 teaches a typical wheelchair.

U.S. Pat. No. 5,044,650 teaches a removable handle which mounts on the handles of a wheelchair in order to permit an attendant to maneuver the wheelchair from a location behind and above the back of the wheelchair. The removable handle includes a handgrip crossbar, two support post each of which is connected with one of the ends of the crossbar, two mounting members which are connected with the support posts in spaced parallel relation. Each mounting members has pins at the distal ends for insertion into the open end of each of the handles of the wheelchair.

U.S. Pat. No. 5,290,055 teaches a push bar for use with a collapsible wheelchair which is adapted for quick disconnect and engagement with hand grips of wheelchairs of a plurality of sizes. The push bar permits an attendant to push the wheelchair with one hand leaving his other hand free to perform other necessary tasks. The push bar includes an elongated bar with hollow sleeve adapters at opposite ends. Each sleeve adapter has a positive locking device. Each of the sleeve adapters receives one of the grip handles in spatial relationship and extends rearwardly in a horizontal plane from the back of the collapsible wheelchair. The push bar eliminates the need to twist a user's wrist thereby making pushing the heavy weight of a patient in wheelchair much easier.

U.S. Pat. No. 4,708,357 teaches an adaptor handle for use on a wheelchair which has two handles. The two handles are spaced apart and are for use in both applying propulsion forces amd steering. The adaptor handle includes an arm, two clamps and a single handgrip. The arm extends in use between the two handles of the wheelchair. Each clamp is adjacent to the end of each of the handles and enables the arm to be coupled onto the two handles. The single handgrip extends substantially from the center of the arm.

Both U.S. Pat. No. 4,872,697 and U.S. Pat. No. 4,964,648 teach an adapter handle for use on wheelchair which has two spaced-apart handles for application of propulsion forces and steering formed by an elongated arm extensible between the spaced-apart handles of the wheelchair. The adapter handle includes a clamp adjacent to each end thereof to enable the adaptor handle to be rapidly coupled onto the spaced-apart handles and a single hand grip extending substantially from the center of the arm. The clamps are formed as over-center latches having plural contact shoes and shoe spacers which allow the adaptor handle to be used on wheelchair having differing sized handle grips. Additionally, one or more auxiliary hooks are provided to enable storage of desired items upon the adaptor handle during use.

U.S. Pat. No. 4,679,816 teaches a wheelchair which includes a body portion, back wheels and front wheels. The wheels are fastened to the body portion. The body portion includes side supports, upper supports and lower supports, and a seat portion is positioned between the side supports, a back in connection with the upper supports, and a foot support in connection with the lower supports. The back wheels of the wheelchair are detachable and the body portion is foldable when the wheelchair is changed from the using position to the transporting position. The side supports are formed by two elongated members: an upper and a lower part, respectively, which extend roughly horizontally in the transporting position, and a front and a back part, respectively, which interconnect the horizontal parts and are shorter than the horizontal parts. The connection points between the parts and the upper support and the side supports are provided with joints, at which points the body portion is foldable to the transporting position. The joint between the upper part of the side support and the front part a thereof and the joint between the lower part the back part are supporting joints. At least one joint of the two side supports is provided with a sleeve, which sleeve is displaceable on the joint in the using position.

U.S. Pat. No. 4,786,072 teaches a collapsible wheelchair and a lift assembly which is permanently mountable in a vehicle and operable for moving the wheelchair and an occupant thereof between the interior and the exterior of the vehicle. The wheelchair includes a chair member and a pair of enlarged rear wheels on the chair member which are operable for movably supporting the rear portion of the chair member on a supporting surface when the chair member is in the erected position thereof. The wheelchair is movable to a collapsed position wherein one of the rear wheels is positioned behind the back portion of the chair member in substantially parallel relation therewith and the other rear wheel is positioned beneath the seat portion of the chair member in substantially parallel relation therewith. When the wheelchair is in the collapsed position, it has a reduced overall profile to enable the wheelchair and an occupant thereof to be effectively moved between the interior and the exterior of a vehicle with the lift assembly.

U.S. Pat. No. 4,598,921 teaches a wheelchair which includes a substantially rigid seat adapted to be mounted on at least two alternative types of carriages having different drive arrangements. Each carriage includes a pair of molded plastic side frames which are interconnected by a bracing mechanism to permit the side frames to be folded together for collapsing the chair or spread apart for erecting the chair. A connecting system including locators which allow the seat to be placed on an approximately fully spread carriage and then to locate the side frames at the correct spacing from one another in order to ensure complete spreading of the carriage, and additionally retainers which allow the seat to be moved into a position in which it cannot be lifted from the thus spread carriage, the retainers allow positive engagement of the seat with the chair with the ability to spread the carriage solely by downward pressure on the seat, thereby enabling a disabled user of the wheelchair to be able to place the seat on the carriage ready for use. A locking assembly prevents the seat from movement so as to disengage the retainers and retain the seat and the carriage in engaged configuration.

SUMMARY OF INVENTION

The present invention is directed to a removable handle for use with a wheelchair having two handles. The removable handle includes a handgrip crossbar having two ends, two support posts each of which is hollow and has a wall and two connectors. Each support post is coupled to one of the two ends of the handgrip crossbar in spaced parallel relation. Each connector connects one of the handles to the other end of one of the support posts.

In a first separate aspect of the invention each connector is cylindrical and has a first end, a second end and a wall.

The connector is fixedly coupled to the handle. Each connector is slidably and detachably coupled to one of the support posts.

In a second separate aspect of the invention each each of the two support posts has two holes in the wall. The holes are longitudinally aligned with each other. Each connector has an inner surface with a groove adjacent to the first end of the connector. The connector also has a flat spring, a first disc and a second disc and is disposed in one of the support posts. Each first disc is fixedly coupled to one of the flat springs and is inserted in one of the two holes of one of the flat springs. Each second disc is fixedly coupled to one of the flat springs and is inserted in the other of the two holes of one of the flat springs. When each support post is inserted into one of the connectors the groove securely engages the first disc. A user depresses the second disc in order to disengage the first disc from the groove.

In a third separate aspect of the invention each connector has a plurality of threaded holes in the wall adjacent to the second end. The threaded holes are radially aligned with each other. Each of a plurality of flat screws is threadedly coupled to one of the threaded holes in order to secure each connector to one of the handles.

In a fourth separate aspect of the invention each connector has a threaded inner wall adjacent to the second end and a threaded compression sleeve. The threaded compression sleeve is threadedly coupled to the threaded inner wall in order to secure each connector to one of the handles.

Other aspects and many of the attendant advantages will be more readily appreciated as the same becomes better understood by reference to the following detailed description and considered in connection with the accompanying drawing in which like reference symbols designate like parts throughout the figures.

The features of the present invention which are believed to be novel are set forth with particularity in the appended claims.

DESCRIPTION OF THE PREFERRED EMBODIMENT

Figure 1:
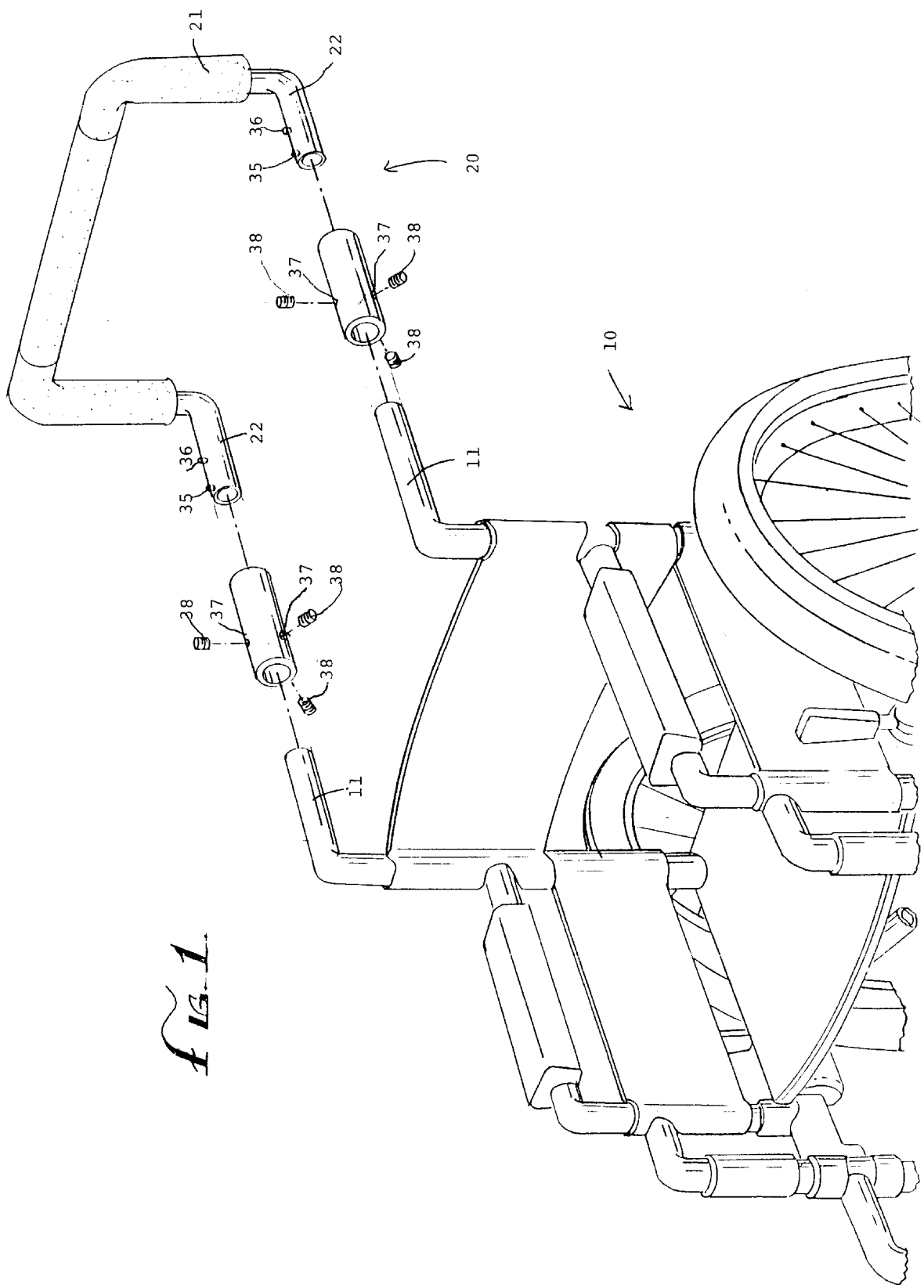
FIG. 1 is an exploded perspective view of a removable handle, including a handgrip crossbar, two support posts and two connectors, according to the first embodiment of the invention in combination with a wheelchair.
Figure 2:
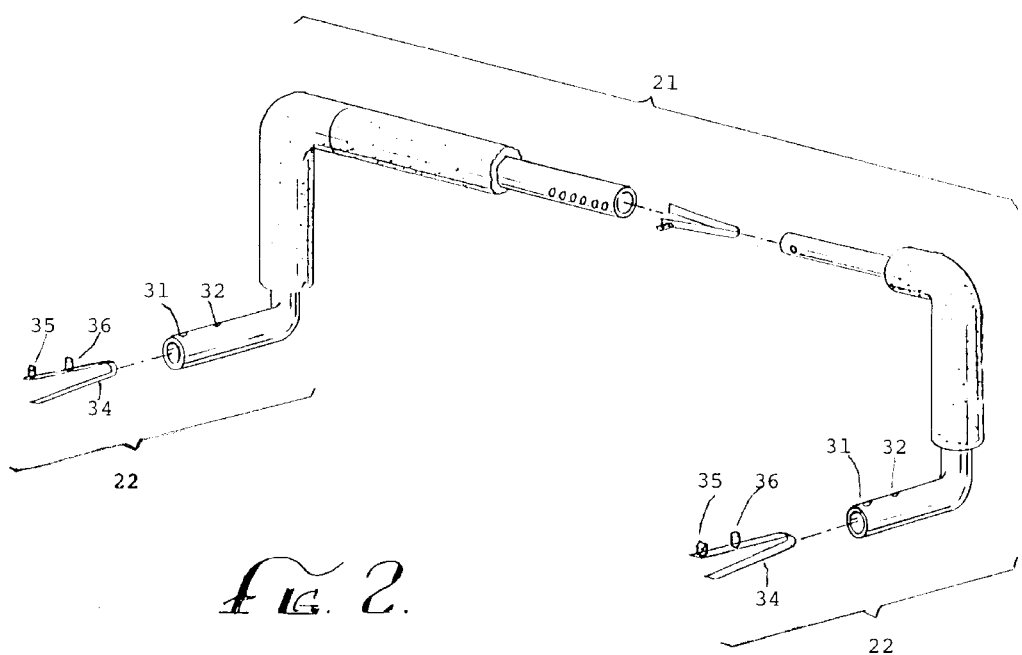
FIG. 2 is an exploded perspective view of the handgrip crossbar and the two support posts of the removable handle of FIG. 1.

Referring to FIG. 1 in conjunction with FIG. 2 a wheelchair 10 has two handles 11. A removable handle 20 includes a handgrip crossbar 21, two support posts 22 and two connectors 23. The handgrip crossbar 21 has two ends. Each support post 22 is hollow and has a wall. Each support post 22 is coupled to one of the two ends of the handgrip crossbar 21 in spaced parallel relation. Each connector 23 connects one of the handles 11 to the other end of one of the support posts 22. Each connector 23 is cylindrical and has a first end, a second end and a wall. The connector 23 is fixedly coupled to one of the two handles 11. The connector 23 is slidably and detachably coupled to one of the support posts 22.

Figure 3:
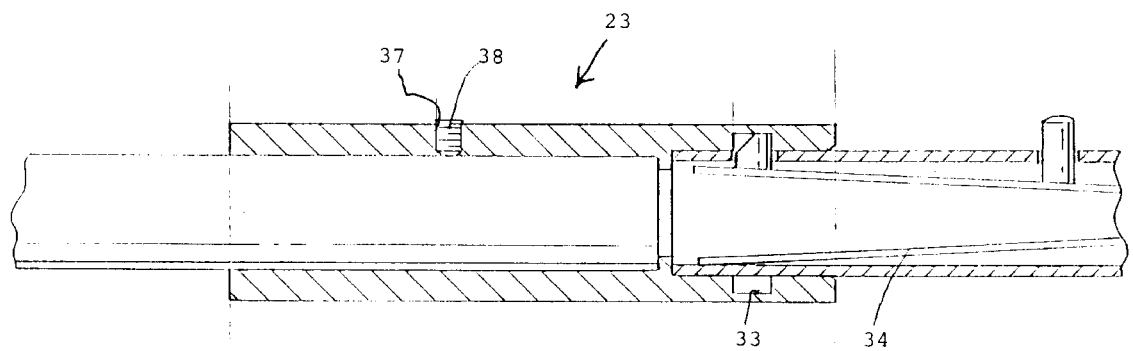
FIG. 3 is a longitudinal view in cross-section of the connector of the removable handle of FIG. 1 distachably engaging one of the support posts.

Referring to FIG. 2 in conjunction with FIG. 3 each support post 22 has a first hole 31 and a second hole 32 in the wall. The first and second holes 31 and 32 are longitudinally aligned with each other. Each connector 23 has an inner surface with a groove 33 adjacent to its first end. Each connector 23 also has a flat spring 34, a first pins 35 and a second pin 36. Each flat spring 34 is disposed in one of the support posts 22. The first and second discs 35 and 36 are fixedly coupled to one of the flat springs 34 and are inserted in one of its first and second holes 31 and 32. When each support post 22 is inserted into one of the connectors 23 the groove 33 securely engages the first pin 35. A user depresses the second disc 36 in order to disengage the first pin 35 from the groove 33.

Referring to FIG. 2 in conjunction with FIG. 3 each connector 23 has a plurality of threaded holes 37 which are radially aligned with each other, in the wall adjacent to the second end. Each of a plurality of flat screws 38 is threadedly coupled to one of the threaded holes 37 in order to secure each connector 23 to one of the handles 11.

Figure 4:
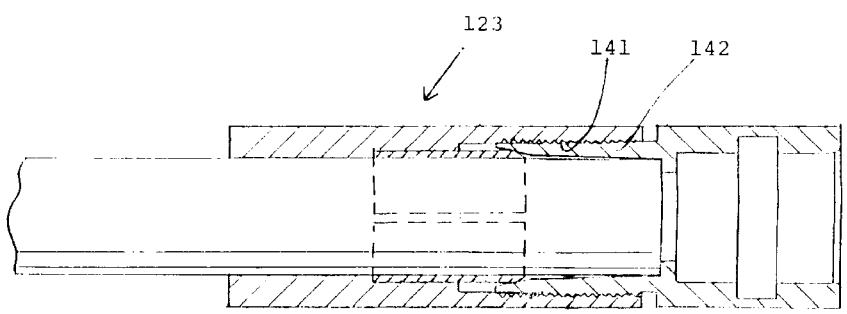
FIG. 4 is a longitudinal view in cross-section of a connector according to the second embodiment of the invention.

Referring to FIG. 2 in conjunction with FIG. 4 each connector 123 has first end and a threaded inner wall 141 adjacent to the second end. A threaded compression sleeve 142 is threadedly coupled to said threaded inner wall 141 in order to secure each connector 123 to one of the handles 11.

From the foregoing it can be seen that a removable handle for mounting on the handles of a wheelchair has been described. It should be noted that the sketches are not drawn to scale and that distance of and between the figures are not to be considered significant. Accordingly it is intended that the foregoing disclosure and showing made in the drawing shall be considered only as an illustration of the principle of the present invention.

What is claimed is:

1. A removable handle assembly for use with a wheelchair having a pair of rearwardly extending tubular handles, the removable handle assembly comprising:

a handgrip crossbar having two ends;

a pair of cylindrical support posts, each post being hollow and having a forward end portion and a rearward end portion, the rearward end portion of each support post being joined to a respective one of said two ends of said handgrip crossbar with the pair of support posts positioned in a spaced parallel relationship, and each support post having a pair of longitudinally spaced holes within the forward end portion;

a pair of connectors, each connector being a cylindrical sleeve having a forward end portion for slidably receiving a rearward end portion of a respective handle and a rearward end portion for slidably receiving a forward end portion of a respective support post, each connector having an annular abutment extending from an inner surface for engagement with forward and rearward ends respectively of the support post and the handle when fully received therein, the forward end portion of each connector having fasteners extending therethrough for releasably securing the connector to a respective handle in a fixed position and the rearward end portion of each connector having an annular groove formed on an inner surface, each connector and support post being configured such that only a forward one of the pair of holes in the support post is enclosed by the rearward end portion of the connector when the forward end portion of the support post is fully received therein; and a pair of bent flat springs, each spring being positioned within the forward end portion of a respective support post, a pair of longitudinally spaced pins fixedly attached to an upper surface of each spring, a forward one of each pair of pins adapted to extend through a forward one of the pair of holes in a respective support post and within the annular groove of a respective connector when each support post is fully received within the respective connector, a rearward one of each pair of pins adapted to extend only through a rearward one of the pair of holes in a respective support post, wherein each rearward pin is adapted to be depressed by a user for disengaging a respective forward pin from within the groove of each connector for permitting removal of the support posts therefrom.

2. A removable handle assembly for use with a wheelchair according to claim 1, wherein the fasteners comprises a plurality of screws received within a plurality threaded openings formed in each connector.

* * * * *